Jan. 15, 1929.  1,699,468
J. H. GRAYSON
THERMOSTAT
Filed Jan. 3, 1928
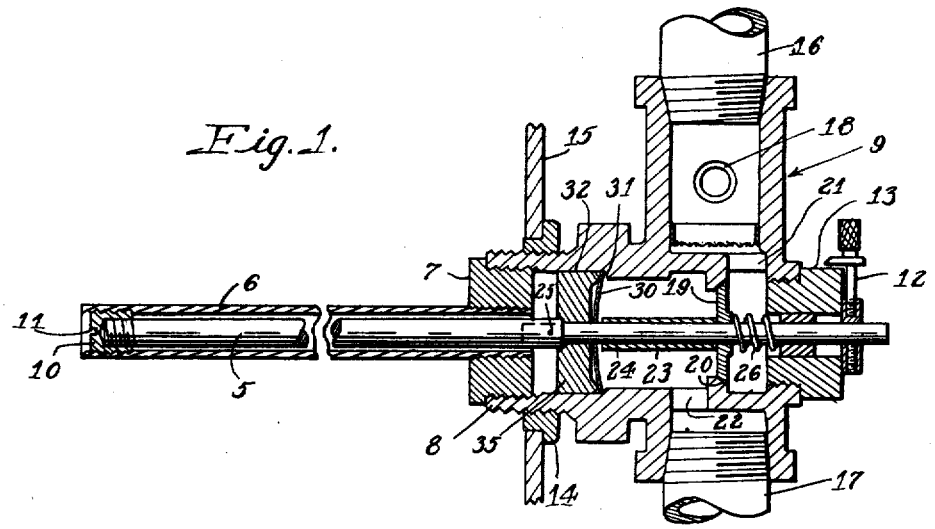
Fig. 1.
Fig. 2.
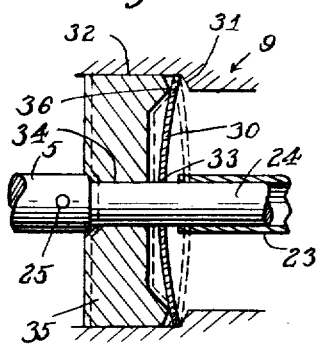
Fig. 3.
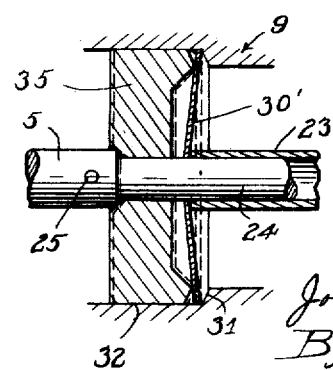
Fig. 4.
Inventor:
John H. Grayson
By
Wilson & McCanna
Attys.

Patented Jan. 15, 1929.

1,699,468

UNITED STATES PATENT OFFICE.

JOHN H. GRAYSON, OF SOUTHGATE, CALIFORNIA.

THERMOSTAT.

Application filed January 3, 1928. Serial No. 244,068.

This invention relates to thermostats generally, but has particular reference to those especially adapted to the requirements of water heaters, oven regulators and allied devices, and, still more particularly, gas operated devices of that type.

The principal object of my invention is to provide a snap-action thermostat of an extremely simple, compact, economical, and durable construction, and one which is more sensitive to temperature changes so that operation within a smaller temperature range is afforded. According to my invention, a snap-action diaphragm disk is provided operated by a preferably solid, non-yielding, circular fulcrum plunger, which in turn is operated directly by the thermally expansible element, instead of by an intermediate fulcrum lever, the same being arranged to give greater movement to the valve to be operated, using a disk of a much smaller diameter than was possible heretofore, all by virtue of the novel arrangement and combination of parts set forth in detail hereinafter.

Still another important object of my invention consists in the provision of an improved temperature adjustment.

The invention is described in detail in the ensuing specification, in which reference is made to the accompanyng drawings, wherein:

Figures 1 and 2 are sections through a thermostatically controlled gas valve of a water heater embodying my invention, Fig. 1 showing the parts in the positions occupied thereby when the water is hot, and Fig. 2 showing the parts in positions corresponding to the water being cold;

Fig. 3 is an enlarged sectional detail to show the cooperation between the plunger, operated directly by one of the thermostat elements, and the diaphragm disk, the amplification in movement secured by reason of the combination of these two parts being rendered clearly evident, and Fig. 4 is a similar view illustrating the use of a modified form of diaphragm disk which, while it secures the same degree of amplification, does not operate with a snap action, being intended for a different purpose, as will presently appear.

Similar reference numerals are applied to corresponding parts throughout the views.

In other thermostats of the diaphragm type with which I am familiar, the diaphragm is clamped around the edge and is worked by an ordinary movement-amplifying fulcrum lever. When it is realized that the amplification with these levers is usually about 1 to 10, the amount of pressure required in the operation thereof can be readily appreciated. One important feature of the device of my invention lies in the use of a circular-fulcrum plunger, operated directly by the movable thermal element, in combination with a convexo-concave diaphragm disk for the amplification, which results in a device that operates with very little pressure. Still another very important feature lies not only in the elimination of the amplified fulcrum lever itself, but also many other parts which the use of said lever necessitated; also in the use of a diaphragm of smaller diameter, making it possible to cut down the size of the unit as a whole.

The thermostat in connection with which my invention is illustrated comprises the usual elements 5 and 6, the one being non-expanding, or having a low cofficient of expansion, and the other being expansible, or having a comparatively high coefficient of expansion. I prefer that the movable element 5 be a rod of invar, which, as is well known, is practically free from expansion or contraction by heat or cold, and that the fixed element 6, the expanding and contracting element, be a brass or copper tube. The tube 6 is threaded or otherwise fixed in a plug 7, threaded in the neck 8 of a cast hollow valve body 9. The rod 5 is adjustably secured at its outer end in the outer end of the tube 6, as by threading into a plug 10, which, in turn, is soldered in the end of the tube 6. By virtue of this connection, it will be evident that expansion and contraction of the tube 6 results in slight endwise movement of the rod 5. It will presently appear how I provide a temperature adjustment by turning the rod 5 in the plug 10 to change the relation between it and the tube 6. The screw driver slot appearing at 11, provided in the plug 10, is used only in the assembling of the device. Adjustment, as will presently appear, is made by the turning of a lever 12 relative to a graduated dial 13. The valve body 9 has the neck 8 threading into a bushing 14, either in the side or bottom of the tank of a gas operated water heater, a portion of the wall of which appears at 15. The valve body 9 is connected between pipes 16 and 17, the former extending from the gas main, and the latter being connected to the burner of the heater. A by-pass connection for the pilot light is provided at 18. Flow of gas from the pipe 16 to the pipe 17 is controlled by a poppet valve 19 shiftable onto and off from the seat 20 provided within the valve body 9 between the inlet and outlet ports 21 and 22 which communicate with the aforesaid pipes 16 and 17, respectively. The valve 19 has the hollow stem 23 thereof slidably received on a rod 24 pinned, as shown at 25, in a recess in the end of the rod 5 previously referred to. The valve is normally held seated by a coiled compression spring 26 assembled on the rod 24 to act between the head of the valve and a plug 27, having a drive fit in the central bore 28 in a plug 29 threading into the valve body 9. It is on the periphery of the plug 29 that the graduated dial 13 previously referred to is etched directly, or else a separate etched dial plate is fastened thereon. The dial may be calibrated or provided simply with "Hot" and "Cold" markings.

The valve 19 has the end of its stem 23 normally spaced slightly from a small diaphragm disk 30 for operation thereby in a manner presently to appear. The disk 30 may be made of a sheet of spring bronze. However, any flexible spring material suitable for the purpose may be employed. The disk, known as a "clicker", is convexo-concave and is arranged to act like a load and fire mechanism; pressure thereon is arranged to flatten the disk toward and up to a dead center condition, whereupon the slightest additional pressure causes the disk to snap past the dead center condition, the neutral point, thus reversing the contour of the disk from convexo-concave to concavo-convex form. The disk is arranged to return of its own accord to the convexo-concave form when the pressure which caused it to snap over is relieved. The small disk 30 with its circular-fulcrum plunger 35 is adapted to supplant the ordinary larger diaphragm and movement-amplifying fulcrum lever so commonly used in devices of the present character. The disk is arranged to rest loosely on an annular shoulder 31 defining the end of the smooth cylindrical bore 32 provided in the neck 8 of the valve body 9. The shoulder 31 is slightly bevelled, as indicated, so that the disk rests thereon only at the very edge thereof. The rod 24 previously referred to passes through the central hole 33 provided in the disk and also through a central hole 34 provided in the plunger 35, slidably received in the bore 32 and arranged by reason of engagement of the end of the rod 5 with the back thereof, to serve in the nature of a follower when the rod 5 is moved endwise, as, for example, when the tube 6 contracts due to the cooling of the water in the tank. The face of the plunger 35 presented to the disk 30 has a projecting annular shoulder 36 which, by reason of the bevelling off of the two sides defining the same, is arranged to have line contact with the disk 30, or, more specifically, contact in a circle of a radius slightly less than that of the disk. As a result, when the rod 5 is moved to the right by reason of contraction of the tube 6, the plunger 35, acting as a follower, exerts pressure on the disk about the rim thereof in moving from the position shown in Fig. 1 (the full line position shown in Fig. 3) to the position shown in Fig. 2 (the dotted line position shown in Fig. 3) and snaps the disk from the convexo-concave condition shown in full lines in Fig. 3 over to that shown in dotted lines. The amplification due to the action of the plunger in causing the disk to snap from a dead center condition to a condition of reversed contour is believed to be quite evident in Fig. 3. It will be observed in said view that, in the initial movement of the plunger, in which the disk is being flattened, the central portion of the disk approaches the end of the stem 23 of the valve 19 and, in the snapping over, the disk opens the valve. The valve is therefore opened quite suddenly. When the temperature of the water in the tank is raised to the predetermined desired temperature for which the thermostat has been set, pressure on the disk is relieved by reason of the rod 5 being retracted in the expansion of the tube 6. The moment that occurs, the disk snaps back to its original form, and the valve 19 seats under the action of its spring 26.

The plunger and diaphragm disk combination operated directly by the movable thermal element in accordance with my invention offers many advantages over the ordinary diaphragm worked from or near the center by a movement amplifying fulcrum lever. For one thing, the lever required considerable pressure to operate the same. The present device, on the other hand, operates with very little pressure, as should be evident from the foregoing description. It is, furthermore, very simple to manufacture, can be made more accurately than the old type of devices, and, moreover, can be made much smaller in over-all size, by reason of the fact that the amplifier disk mounted in the particular way shown may be of a much smaller diameter than was heretofore necessitated. The last point will be clear when it is considered that in the old type devices the diaphragm was clamped tightly around the edge between two castings and secured by screws, whereas in my construction the diaphragm is comparatively loose, thus permitting greater movement with a disk of smaller diameter, due to the fact that the extreme edge, being free, may snap over from normal condition to reversed condition, and vice versa. In other words, if a diaphragm as small in diameter as the present one were clamped at the edge, it could have no snap action because radial expansion of the disk under pressure would not be permitted in such a construction. In the present construction it takes much less pressure to operate the disk because of its freedom for radial expansion, and there is also the advantage that there is little danger of the disk becoming permanently distorted. The elimination of the amplified fulcrum lever, it should also be borne in mind, is of importance for the reason that many other parts required in a lever assembly are likewise eliminated, making for much greater simplicity and resulting in lower cost.

The temperature adjustment, as previously stated, is made by turning the lever 12 relative to the dial 13. This lever has a pointer 37 sweeping over the dial and is clamped by means of a collar 38 to the outer end of the rod 24. Since the latter is pinned to the rod 5 and the rod 5 threads into the plug 10, it will be evident that the turning of the lever results in endwise adjustment of the rod 5 with respect to the tube 6 and affects the operation of the disk 30 by the follower 35; if, for example, the dial has "Hot" and "Cold" markings thereon, the shifting of the lever toward "Hot" results in unscrewing the rod 5, and vice versa in the shifting of the lever toward "Cold".

The invention is also applicable to devices where the valve, instead of being simply opened and closed according to temperature changes, is opened more or less according to temperature fluctuations, as, for example, where it is desired to maintain a substantially even temperature, as in oven regulators. Thermostat valves employed for such purposes are operated as throttle valves. In the application of my invention to that type of valve, I change the shape of the diaphragm disk from dished, convexo-concave form to conical, convexo-concave form, as shown at 30' in Fig. 4, inasmuch as the disk in that case is not to have a snap action. It will be observed that in that construction the end of the valve stem 23 is in direct engagement with the central portion of the disk at all times, that is, even when the disk is undistorted. Thus, the moment the plunger 35 exerts pressure on the disk 30', tending to flatten the same, the valve 23 commences to open, the opening movement being amplified to the extent indicated in the drawing. The device will be so designed and constructed where the conical amplifier disk is used that there can be no snap action of the disk. In other words, the disk will never be distorted quite up to or beyond the dead center.

It is believed the foregoing description conveys a clear understanding of the objects and advantages of my invention. While I have illustrated and described the application thereof in the case of gas operated water heaters and in the case of oven regulators, it should be understood that there are numerous other possible applications. All legitimate modifications and adaptations of my invention are therefore to be construed as coming within the spirit and scope of the appended claims.

I claim:

1. In a themostatic device of the character described, the combination with a thermostatic element arranged to move according to temperature variations, of a valve or other element arranged to be operated, an amplifier disk of spring material, means for supporting said disk about the edge thereof, and a plunger engaged directly by the thermostatic element and guided for movement so that it is arranged to exert pressure on the disk near the edge thereof, the said valve having its stem disposed for operation by the central portion of the disk.

2. In a thermostatic device of the character described, the combination with a thermostatic element sensitive to temperature variations, of a valve or other element arranged to be operated, an amplifier disk of spring material normally substantially convexo-concave in form, means for supporting said disk about the edge thereof, said means leaving the edge of the disk comparatively loose and free for the purposes described, and a part engaged directly by the thermastatic element arranged to exert pressure on the disk near the edge thereof, the said valve being disposed for operation from the central portion of the disk.

3. In a thermostatic device of the character described, the combination of a body member, a tube having a rod mounted therein to form a thermostat, the tube being fixed on the body and having the rod extending into said body and arranged to move endwise in the event of temperature variation, a valve or other device to be operated according to temperature variations mounted in said body, a spring diaphragm disk of substantially convexo-concave form supported loosely about its outer edge in said body with the center portion thereof disposed in operative relation to the valve stem, and a non-yielding plunger arranged to be moved by the thermostat rod, said plunger having a circular bearing thereon to exert pressure on the back of the disk near the outer edge.

4. A device as set forth in claim 3 wherein the disk is disposed substantially concentric with the thermostat rod, the plunger being concentric with the disk and rod and having operative relation with the rod centrally thereof and operative engagement with the disk annularly and near the outer edge of the latter.

5. A thermostatic device of the character described comprising, in combination, a body member, a thermostat mounted thereon, the elements of which comprise a tube fixed on the body, and a rod therein extending into the body and arranged to have a certain amount of endwise movement in the event of temperature variation, said rod having an extension, a valve reciprocable on said extension to and from a seat in said body, said valve tending normally to move one way, a substantially convexo-concave spring diaphragm disk supported at its edge on an annular shoulder in said body and having said extension passing through a central hole therein, said valve having the end of the stem thereof disposed for engagement and operation by the central portion of said disk, and a plunger element between the disk and the rod arranged for movement by said rod in the event of temperature variation, said plunger element having engagement with the disk in a circle near the edge thereof.

6. A device as set forth in claim 5 wherein the valve is normally seated and wherein the end of the stem thereof is normally in slightly spaced relation to the disk, the disk being normally substantially of convexo-concave form and arranged to be snapped over dead center to concavo-convex form to open the valve, the said disk upon the relieving of pressure being arranged to snap back of its own accord to convexo-concave form and permitting the closing of the valve.

7. A device as set forth in claim 5 wherein the valve is normally spring-pressed toward closed position and has the end of the stem thereof normally in slightly spaced relation to the disk, said disk being normally convexo-concave in form, but upon application of pressure thereon being arranged to snap over dead center to reversed form, and including means for adjusting the thermostat in relation to the disk.

8. A device as set forth in claim 5 wherein the thermostat is adjustable by turning the rod element relative to the tube element and wherein the rod extension extends from the body member and is arranged to be turned for adjustment purposes.

9. In a device as set forth in claim 5 wherein the thermostat is adjustable by turning the rod element relative to the tube element and wherein the rod extension extends from the body member and is arranged to be turned for adjustment purposes, an indicator lever fixed on the outer end of said extension, and a dial in relation to which said lever is movable.

10. A thermostatic device of the character described comprising, in combination, a valve body member, a thermostat, the elements of said thermostat comprising a tube fixed on said body member and a rod threadedly engaged at its outer end in the outer end of said tube and extending into said body member and arranged to have endwise movement in the event of temperature variation, said body member having a cylindrical bore, a plunger slidably received in said bore having an extension of said rod passing through a central hole provided therein whereby the plunger is arranged to have pressure exerted thereon by the rod, there being an annular shoulder defining the inner end of said bore, a spring metal, normally convexo-concave, diaphragm disk resting freely at its edge on said shoulder in front of said plunger, said plunger having the face thereof conformed for engagement with the disk in a circle near the outer edge thereof, said disk having a central opening through which the rod extension passes, a valve slidably mounted on said rod extension for movement toward and away from a seat in said body member, spring means normally seating said valve, said valve having the end of the stem thereof disposed in slightly spaced relation to the central portion of said disk, the rod extension projecting from said body member, and means mounted on the outer end of said extension for turning the same to adjust the rod element of the thermostat with respect to the tube element.

11. A thermostatic device of the character described comprising, in combination, a valve body member, a thermostat, the elements of said thermostat comprising a tube fixed on said body member and a rod engaged at its outer end in the outer end of said tube and extending into said body member and arranged to have endwise movement in the event of temperature variation, said body member having a cylindrical bore, a plunger slidably received in said bore having an extension of said rod passing through a central hole provided therein whereby the plunger is arranged to have pressure exerted thereon by the rod, there being an annular shoulder defining the inner end of said bore, a spring metal, normally convexo-concave, diaphragm disk resting at its edge on said shoulder in front of said plunger, said plunger having the face thereof conformed for engagement with the disk in a circle near the outer edge thereof, said disk having a central opening through which the rod extension passes, a valve slidably mounted on said rod extension for movement toward and away from a seat in said body member, and spring means normally seating said valve.

12. In a thermostatic control, the combination with a thermostatic element sensitive to temperature variations, of a device arranged to be operated, a normally convexo-concave spring action disk, means serving to support the disk about the outer edge thereof, a part arranged to be engaged by the disk centrally thereof, a plunger part guided so that it is arranged to engage the disk substantially in a circle near the outer edge thereof, one of said parts being arranged to cause the operation of the said device, and the other part being engaged directly by the thermostatic element.

13. In a thermostatic device of the character described, the combination with a thermostatic element arranged to move according to temperature variations, and a valve or other element disposed substantially concentric therewith arranged to be correspondingly operated, of a spring metal distortable disk disposed substantially concentric with said valve whereby to communicate movement thereto from its approximate center, said disk being supported about the outer edge thereof, and a follower operated directly by and moving with said thermostatic element and having bearing contact with said disk near the outer edge thereof.

14. In a thermostatic device of the character described, the combination with a thermostatic element arranged to move according to temperature variations, and a valve or other element disposed substantially concentric therewith arranged to be correspondingly operated, of a spring metal distortable disk disposed substantially concentric with said valve whereby to communicate movement thereto from its approximate center, said disk being supported about the outer edge thereof, and a follower operated directly by and moving with said thermostatic element and having an annular knife-edged shoulder on the face thereof presented to the disk arranged to engage the disk in a circle near the outer edge thereof.

15. In a thermostatic device of the character described, the combination with a thermostatic element arranged to move according to temperature variations, and a part disposed substantially concentric therewith arranged to be correspondingly operated, of a normally convexo-concave disk of spring material arranged to be flexed to and beyond dead center so as to snap over to concavo-convex form by reason of the springiness of the material thereof, said disk being freely supported about its outer edge and being arranged to communicate movement to the part from its approximate center, and a follower operated directly by and moving with said thermostatic element and having an annular knife-edged shoulder on the face thereof presented to the disk arranged to engage the disk in a circle near the outer edge thereof.

16. In a thermostatic device of the character described the combination with a thermostatic element arranged to move according to temperature variations and a valve or other element arranged to be correspondingly operated, of a clicker disk of spring material arranged to impart movement to said valve from the approximate center thereof, means providing support for the outer edge of said disk on one side thereof, the edge of the disk resting freely thereon, and a follower operated directly by and moving with the thermostatic element and having contact with the other side of the disk near the outer edge thereof.

17. In a thermostatic device of the character described, the combination of a thermostatic element arranged to have movement in the event of temperature variation, a valve or other element substantially coaxial therewith arranged to be correspondingly operated but in an amplified degree, a clicker disk substantially coaxially arranged with respect to said valve supported freely about the edge thereof and arranged to communicate movement to the part from its approximate center, and a single element means for transmitting movement directly from the thermostatic element to the clicker disk arranged to operate so that for every slight movement of the thermostatic element there is amplified movement of the central portion of said disk.

18. In a thermostatic device of the character described, the combination with a thermostatic element arranged to move in the event of temperature variation, of a valve or other element arranged to be operated, said valve having its stem disposed substantially concentric with the thermostatic element, a movement-amplifying disk of spring material normally substantially convexo-concave in form, said disk being supported loosely about the edge thereof substantially in concentric relation to the valve and the thermostatic element whereby the valve stem is arranged to be operated from the approximate center of the front of the disk, and a substantially non-yielding plunger operated directly by the thermostatic element and disposed behind the disk and substantially concentric therewith and with the valve and thermostatic element, said plunger being arranged in the event of temperature variation to communicate pressure to the back of the disk whereby to force the same from convexo-concave form toward concavo-convex form.

19. In a device of the character described, in combination with a main body, a member adapted to be thermostatically operated, a thermostat adapted to operate said member, and means for transmitting motion from said thermostat to said member, said means comprising only two elements, namely, a normally convexo-concave spring-action disk mounted in said body with a normally concave side towards said member and operatively related thereto, said disk being adapted when pressed on its convex side to snap over into a reverse curvature, and a plunger bearing on one side on the convex side of said disk near the margin thereof and on the other side in direct operative relation with said thermostat.

20. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body so that the marginal edge thereof is loosely supported and radial expansion of said disk under pressure is permitted, said disk having a normally concave side towards said member and operatively related thereto and being adapted when pressed on its convex side to snap over into a reverse curvature, and a plunger bearing on one side on the convex side of said disk near the edge thereof and on the other side in operative relation with the thermostat.

21. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body so that radial expansion of said disk under pressure is permitted, said disk having a normally concave side towards said member and operatively related thereto and being adapted when pressed on its convex side to snap over into a reverse curvature, and a plunger bearing on one side on the convex side of said disk near the edge thereof and on the other side in operative relation with the thermostat, said disk, thermostat, plunger and member being concentrically positioned with reference to each other.

22. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body with a normally concave side towards said member and operatively related thereto, said disk being of small diameter but mounted so as to be free to expand radially when pressure is applied thereto, whereby it is adapted when pressed on its convex side to snap over into a reverse curvature and to automatically return to its normal position when pressure is released, and a plunger bearing on one side on the convex side of said disk near the margin thereof and on the other side in direct operative relation with said thermostat.

23. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body so that the marginal edge thereof is loosely supported and radial expansion of said disk under pressure is permitted, said disk having a normally concave side towards said member and operatively related thereto and being adapted when pressed on its convex side to snap over into a reverse curvature and to automatically return to its normal position when pressure is released, and a plunger bearing on one side on the convex side of said disk near the edge thereof and on the other side in operative relation with the thermostat.

24. In a thermostatic device of the character described, the combination with a thermostatic element sensitive to temperature variations, of a valve or other element arranged to be operated, an amplifier disk adapted for spring action, said disk being substantially convexo-concave in form, means for supporting said disk about the edge thereof for its spring action, said means leaving the edge of the disk comparatively loose and free for the purposes herein described, and a plunger moved by the thermostatic element and arranged to transmit its movement to the disk in such a way that for every given movement of the plunger with the thermostatic element there is amplified movement of the central portion of the disk, the said valve being arranged for operation from the central portion of the disk.

In witness whereof I hereunto affix my signature.

JOHN H. GRAYSON.

DISCLAIMER 1,699,468.—*John H. Grayson*, Southgate, Calif. THERMOSTAT. Patent dated January 15, 1929. Disclaimer filed June 4, 1943, by the assignee, *Grayson Heat Control, Ltd.*

Hereby enters this disclaimer to claims 19, 20, 21, 22, and 23 of said specification.

[*Official Gazette July 13, 1943.*]

cave side towards said member and operatively related thereto, said disk being adapted when pressed on its convex side to snap over into a reverse curvature, and a plunger bearing on one side on the convex side of said disk near the margin thereof and on the other side in direct operative relation with said thermostat.

20. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body so that the marginal edge thereof is loosely supported and radial expansion of said disk under pressure is permitted, said disk having a normally concave side towards said member and operatively related thereto and being adapted when pressed on its convex side to snap over into a reverse curvature, and a plunger bearing on one side on the convex side of said disk near the edge thereof and on the other side in operative relation with the thermostat.

21. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body so that radial expansion of said disk under pressure is permitted, said disk having a normally concave side towards said member and operatively related thereto and being adapted when pressed on its convex side to snap over into a reverse curvature, and a plunger bearing on one side on the convex side of said disk near the edge thereof and on the other side in operative relation with the thermostat, said disk, thermostat, plunger and member being concentrically positioned with reference to each other.

22. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body with a normally concave side towards said member and operatively related thereto, said disk being of small diameter but mounted so as to be free to expand radially when pressure is applied thereto, whereby it is adapted when pressed on its convex side to snap over into a reverse curvature and to automatically return to its normal position when pressure is released, and a plunger bearing on one side on the convex side of said disk near the margin thereof and on the other side in direct operative relation with said thermostat.

23. In a device of the character described, in combination with a main body, a member adapted to be thermostatically operated, a thermostat adapted to operate said member, and means for transmitting motion from said thermostat to said member, said means comprising a normally convexo-concave spring-action disk mounted in said body so that the marginal edge thereof is loosely supported and radial expansion of said disk under pressure is permitted, said disk having a normally concave side towards said member and operatively related thereto and being adapted when pressed on its convex side to snap over into a reverse curvature and to automatically return to its normal position when pressure is released, and a plunger bearing on one side on the convex side of said disk near the edge thereof and on the other side in operative relation with the thermostat.

24. In a thermostatic device of the character described, the combination with a thermostatic element sensitive to temperature variations, of a valve or other element arranged to be operated, an amplifier disk adapted for spring action, said disk being substantially convexo-concave in form, means for supporting said disk about the edge thereof for its spring action, said means leaving the edge of the disk comparatively loose and free for the purposes herein described, and a plunger moved by the thermostatic element and arranged to transmit its movement to the disk in such a way that for every given movement of the plunger with the thermostatic element there is amplified movement of the central portion of the disk, the said valve being arranged for operation from the central portion of the disk.

In witness whereof I hereunto affix my signature.

JOHN H. GRAYSON.

DISCLAIMER 1,699,468.—*John H. Grayson*, Southgate, Calif. THERMOSTAT. Patent dated January 15, 1929. Disclaimer filed June 4, 1943, by the assignee, *Grayson Heat Control, Ltd.*

Hereby enters this disclaimer to claims 19, 20, 21, 22, and 23 of said specification.

[*Official Gazette July 13, 1943.*]